United States Patent [19]
Vendely et al.

[11] Patent Number: 6,029,992
[45] Date of Patent: Feb. 29, 2000

[54] AIR BAG MODULE AND STEERING WHEEL ASSEMBLY

[75] Inventors: Michael Joseph Vendely, Kettering; Robert Raymond Niederman; David Scott Weckesser, both of Dayton; Brian Thomas Finnigan, Lewisburg; Francis Joseph Holmes, Beavercreek, all of Ohio

[73] Assignee: General Motors Corporation, Detroit, Mich.

[21] Appl. No.: 08/976,784

[22] Filed: Nov. 24, 1997

Related U.S. Application Data

[63] Continuation-in-part of application No. 08/725,149, Oct. 2, 1996, Pat. No. 5,762,359.

[51] Int. Cl.⁷ .................................................. B60R 21/16
[52] U.S. Cl. ...................................... 280/728.2; 280/731
[58] Field of Search ........................... 280/728.2, 731, 280/732

[56] References Cited

U.S. PATENT DOCUMENTS

| | | | |
|---|---|---|---|
| 4,877,264 | 10/1989 | Cuevas | 280/731 |
| 4,989,897 | 2/1991 | Takada | 280/728.3 |
| 5,087,069 | 2/1992 | Corbett et al. | 280/731 |
| 5,141,247 | 8/1992 | Barth | 280/728.2 |
| 5,167,427 | 12/1992 | Baba | 280/728.3 |
| 5,186,492 | 2/1993 | Wright et al. | 280/728.2 |
| 5,201,541 | 4/1993 | Jones et al. | 280/731 |
| 5,207,544 | 5/1993 | Yamamoto el al. | 411/348 |
| 5,259,641 | 11/1993 | Schenk et al. | 280/731 |
| 5,280,946 | 1/1994 | Adams et al. | 280/728.2 |
| 5,312,129 | 5/1994 | Ogawa | 280/728.2 |
| 5,320,379 | 6/1994 | Burnard et al. | 280/728.2 |
| 5,333,897 | 8/1994 | Landis et al. | 280/728.2 |
| 5,350,190 | 9/1994 | Szigethy | 28/728.2 |
| 5,354,093 | 10/1994 | Schenck et al. | 280/728.3 |
| 5,380,037 | 1/1995 | Worrell et al. | 280/728.3 |
| 5,388,858 | 2/1995 | Cuevas | 280/728.2 |
| 5,409,256 | 4/1995 | Gordon et al. | 280/728.2 |
| 5,470,099 | 11/1995 | Williams | 280/728.2 |
| 5,470,100 | 11/1995 | Gordon | 280/728.2 |
| 5,496,057 | 3/1996 | Niederman | 280/728.2 |
| 5,505,483 | 4/1996 | Taguchi et al. | 280/728.2 |
| 5,505,488 | 4/1996 | Allard | 280/740 |
| 5,556,125 | 9/1996 | Ricks et al. | 280/728.2 |
| 5,577,768 | 11/1996 | Taguchi et al. | 280/728.2 |
| 5,590,900 | 1/1997 | Duran et al. | 280/728.2 |
| 5,597,177 | 1/1997 | Matsuura | 280/728.2 |
| 5,636,858 | 6/1997 | Niederman | 280/728.2 |

FOREIGN PATENT DOCUMENTS

131886  5/1993  Japan.

*Primary Examiner*—Kenneth R. Rice
*Attorney, Agent, or Firm*—Kathryn A. Marra

[57] ABSTRACT

An air bag module and steering wheel assembly includes an air bag module and a steering wheel. The air bag module includes a base plate and an air bag. At least one mounting member extends from the base plate and through the air bag to attach the air bag to the base plate. A cover has at least one vertically extending side wall including at least one cover slot in which the air bag and base plate are loosely seated therein while leaving the cover free for manual removal from the base plate. The air bag is trapped in the cover slot between side wall and the base plate. The steering wheel has a receiving area for receiving the module therein for attachment to the steering wheel. An upstanding capture plate forms a vertically extending wall generally surrounding the receiving area. The capture plate engages the side wall of the cover when the module is inserted into the receiving area and captures the side wall of the cover and the air bag between the base plate and the capture plate such that the cover and the air bag are anchored to the base plate for withstanding the forces of air bag inflation.

17 Claims, 6 Drawing Sheets

AIR BAG MODULE AND STEERING WHEEL ASSEMBLY

This application is a continuation-in-part of U.S. Ser. No. 08/725,149 filed Oct. 2, 1996, now U.S. Pat. No. 5,762,359.

This invention relates to an air bag module and steering wheel assembly having an air bag module cover secured to the module without the use of fasteners.

BACKGROUND OF THE INVENTION

It is well known in motor vehicles to provide an air bag module mounted to a steering wheel. A typical driver's side air bag module includes a generally circular inflator positioned partially within a bag opening of an air bag for discharging inflator gas to inflate the air bag upon sensing certain predetermined vehicle conditions. The undeployed air bag is folded atop the inflator and a module cover overlies the air bag, inflator and other module components.

The air bag module is formed as a separate and independent unit from the steering wheel. The cover, air bag, and inflator are each securely anchored to a base plate of the module such that inflation forces can be withstood. In addition, the module typically includes a plurality of axially elongated mounting members extending downwardly from the base plate for connecting the module to a mounting portion of a steering wheel.

The cover of the air bag module overlies the air bag, inflator and other module components to form an aesthetically pleasing cover which is durable for normal vehicle use. The cover commonly has tear lines or weakened portions that allow the cover to open during air bag inflation. It is known to connect the cover of the air bag module to the base plate by a plurality of fasteners, such as rivets or screws. The use of multiple fasteners increases assembly time.

The prior art has also suggested attachment of the cover by the use of mating overlapping tabs on each of the cover and base plate. However, assembly is still difficult since the tabs on the base plate are rigid metal which must be bent or crimped into place. The suggestion has also been made to form tabs on the cover with inwardly and upwardly turned J-shaped hooks on the tabs which are inserted into mating holes in the base plate. However, the hooks on the tabs are not sufficiently thick to securely maintain the cover to the base plate during inflation since the hooks must be thin enough to be inserted through the holes during assembly. Since the hooks do not tightly fit in the holes, they are free to pull out of the holes under the forces of air bag inflation. Thus, the prior art has taught adding additional components to the module such as a snap-in-place ring that acts as a spacer to fill the holes to prevent removal of the hooks from the holes during air bag inflation.

SUMMARY OF THE INVENTION

The present invention provides a cover which is easily attached to the module without the use of fasteners. Advantageously, the cover is initially loosely secured to the module and then securely anchored to the module by utilizing the structure of the steering wheel. Advantageously, the cover is anchored to the module without the use of fasteners and without the use of separate components that must be handled and manipulated with the module. Advantageously, the cover is easily anchored to the module simply by the unidirectional attachment of the module to the steering wheel which greatly eases assembly over the prior art. Also advantageously, the present invention preferably enables easy initial loose attachment of the cover to the base plate which is sufficiently strong for storage and transport prior to installation on the steering wheel. Unidirectional attachment of the module to the steering wheel also simultaneously securely anchors the cover to the module. Also advantageously, removal of the cover for servicing can easily be accomplished without damaging the cover when the module is removed from the steering wheel. In addition, the cover is aesthetically pleasing and has structure which hides the attachment locations on the cover from view such that they cannot be detected by the vehicle occupants when the module is assembled to the steering wheel.

Other advantages of the invention include the elimination of the air bag retainer and attachment of the air bag directly to the base plate. Attachment of the module to the steering wheel also advantageously provides secondary securement of the air bag to the base plate.

These advantages are accomplished in the present invention by providing an air bag module and steering wheel assembly including an air bag module and a steering wheel. The air bag module includes a base plate and an air bag. At least one mounting member extends from the base plate and through the air bag to attach the air bag to the base plate. A cover has at least one downwardly extending side wall including at least one cover slot in which the air bag and base plate are loosely seated while leaving the cover free for manual removal from the base plate. The air bag is trapped in the cover slot between the side wall and the base plate. The steering wheel has a receiving area for receiving the module therein for attachment to the steering wheel. An upstanding capture plate forms a vertically extending wall generally surrounding the receiving area. The capture plate engages the side wall of the cover when the module is inserted into the receiving area and captures the side wall of the cover and the air bag between the base plate and the capture plate such that the cover and the air bag are anchored to the base plate for withstanding the forces of air bag inflation.

Preferably, the inflator has a radially outwardly extending inflator flange and the mounting member extends through the inflator flange to connect the inflator flange to the base plate. The air bag is also captured between the inflator flange and the base plate. Also preferably, the cover slot is defined by at least one upper boss and at least one lower boss and the air bag and base plate are captured between the upper and lower bosses. The upper and lower bosses are generally planar and extend generally perpendicular to and radially inward from the side wall of the cover.

According to other preferred aspects of the invention, the side wall of the cover includes a plurality of downwardly extending tab portions each having upper and lower inwardly projecting bosses thereon. The lower bosses are spaced vertically beneath the upper bosses such that the upper bosses are positioned above the base plate and the lower bosses are positioned below the base plate when the cover is connected to the base plate. The air bag is wrapped around the base plate and is positioned between the upper and lower bosses and the base plate, whereby upon insertion of the module into the receiving area of the steering wheel, the tab portions are trapped between the base plate and the vertically extending wall of the capture plate and the tab portions are prevented from outward movement and the respective bosses are trapped above and below the base plate to anchor the cover and the air bag to the base plate during air bag deployment.

Additional features of the invention provide a method of assembling an air bag module and steering wheel assembly.

The method includes providing an air bag module including a base plate having mounting members extending therefrom and an air bag having a mouth portion including apertures therein; inserting the mounting members through respective air bag apertures and wrapping the mouth portion of the air bag around an outer edge of the base plate to loosely connect the air bag to the base plate; providing a cover of the module having a vertically extending side wall including a plurality of inwardly projecting upper and lower bosses thereon; pulling the cover over the base plate and inserting the base plate and air bag between the upper and lower bosses to loosely connect the cover to the base plate for transport and storage while leaving the cover free for removal from the base plate; providing a steering wheel including a receiving area for receiving the module therein and the steering wheel having a capture plate including an upstanding vertical wall surrounding the receiving area; and inserting the module into the receiving area such that the vertical wall engages the side wall of the cover and simultaneously capturing the side wall of the cover between the base plate and the vertical wall of the steering wheel such that the cover is anchored to the base plate for withstanding the forces of air bag inflation and such that the base plate and air bag are securely trapped between the upper and lower bosses.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
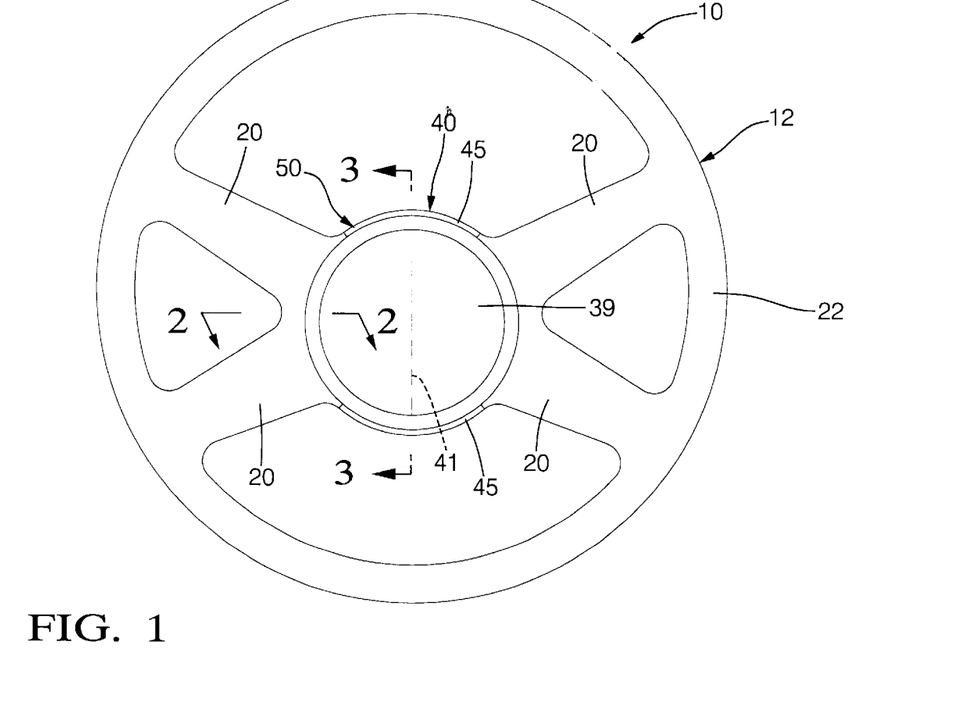
FIG. 1 is front plan view of an air bag module and steering wheel assembly in the fully assembled condition.
Figure 2:
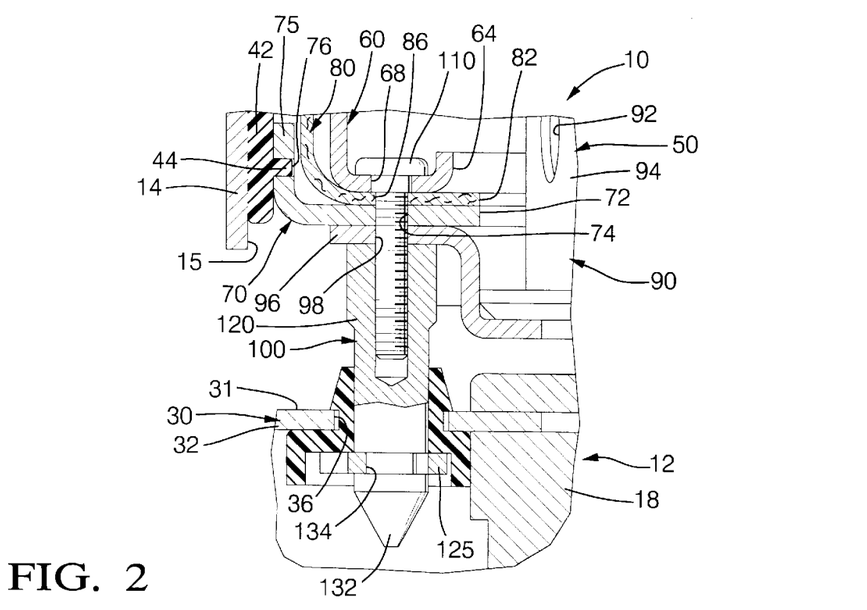
FIG. 2 is a sectional view taken along line 2—2 of FIG. 1.
Figure 3:
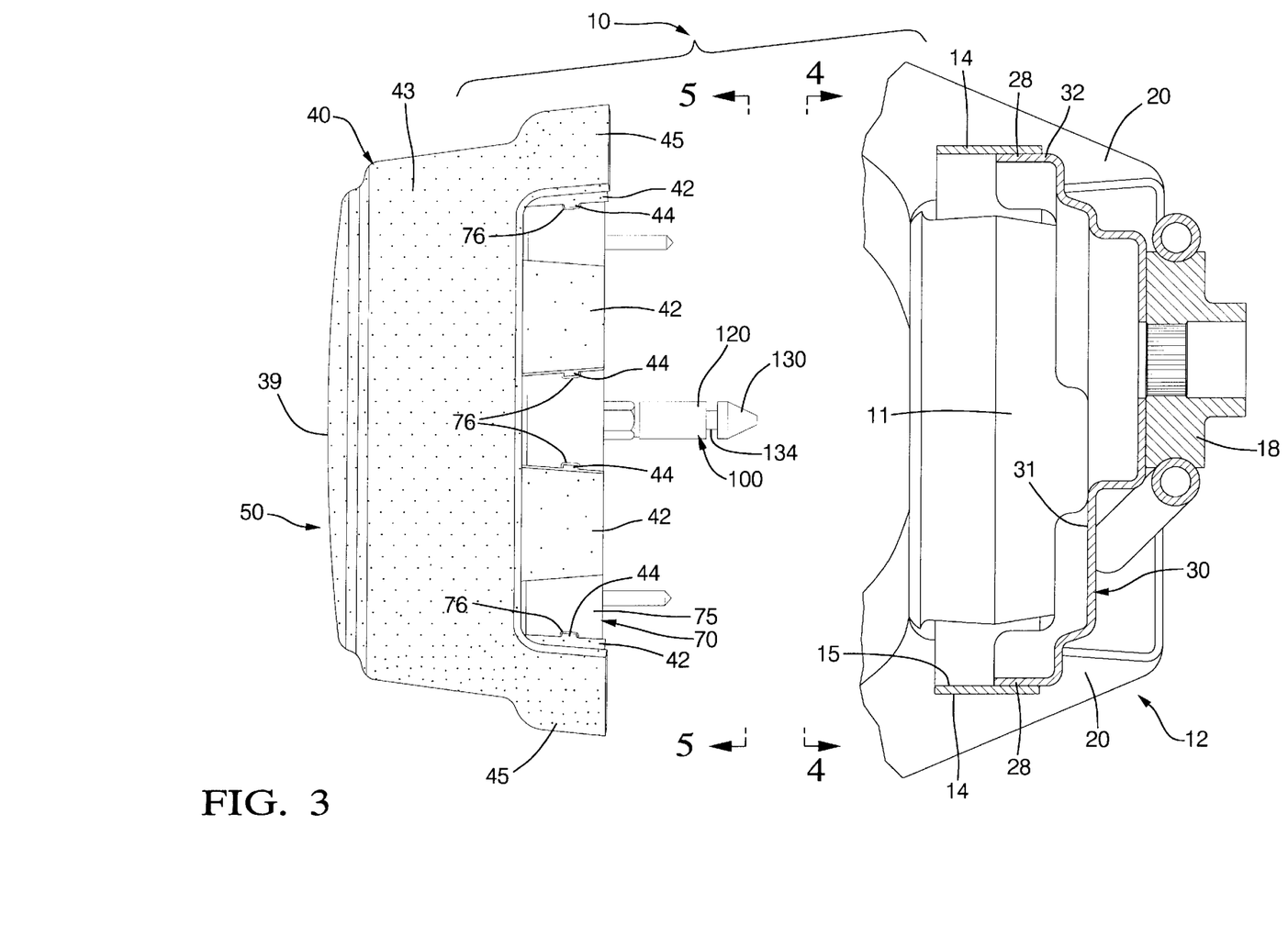
FIG. 3 is an exploded view of the air bag module and steering wheel assembly showing a side view of the air bag module and showing a cross-sectional view of the steering wheel with the spoke portions partially broken-away.
Figure 4:
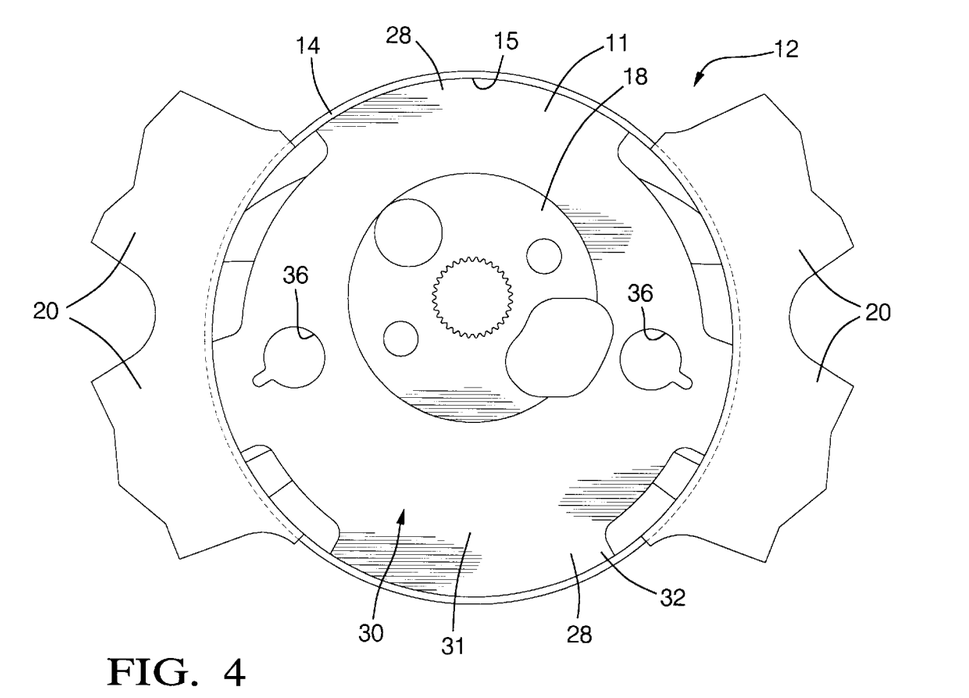
FIG. 4 is a top plan view of the steering wheel with the spoke portions partially-broken-away.

Referring to FIGS. 1 and 2, a vehicle includes an air bag module and steering wheel assembly, generally designated as 10, including a steering wheel 12 for mounting on a steering column (not shown) and an air bag module 50 mounted on the steering wheel 12. As best shown in FIGS. 1, 3 and 4, the steering wheel 12 includes a mounting portion 30 attached to a central hub portion 18 and outwardly extending spoke portions 20. An outer circular rim portion 22 is connected to the central hub portion 18 by the spoke portions 20. As best shown in FIG. 4, the steering wheel 12 has an open receiving area 11 for receiving the air bag module 50 therein. The air bag module 50 is inserted within the receiving area 11 and mounted to the mounting portion 30 of the steering wheel 12.

The mounting portion 30 is preferably made of a sturdy material, such as metal, and is preferably welded to or integrally molded with the hub portion 18 and spoke portions 20 of the steering wheel 12. The mounting portion 30 preferably has a generally planar mounting surface 31 and has a generally circular shape. However, many other shapes are possible for the mounting portion 30, such as rectangular, triangular or any other suitable geometric shape which complements the shape of the air bag module 50. As best shown in FIG. 3, the mounting portion 30 has perimetral side edges 32 that are shown as having upturned portions 28, but which alternately may be downturned or simply flat. As shown in FIG. 4, the mounting portion 30 includes a plurality of mounting apertures 36 for attachment of the air bag module 50, as described further hereinafter.

As best shown in FIGS. 2, 3 and 4, the steering wheel 12 further includes a capture plate 14 which is attached to the side edges 32 of the mounting portion 30, such as by welding. The capture plate 14 is preferably a single continuous ring having the same geometric shape as the side edges 32 of the mounting portion 30 for ease of attachment thereto. The capture plate 14 is preferably made of a rigid sturdy material, such as metal. The capture plate 14 preferably extends generally perpendicular to the mounting portion 30 and is generally vertically extending relative the steering wheel 12 for ease of insertion of the module 50 into the receiving area 11 of the steering wheel 12, as described further hereinafter. The capture plate 14 provides an upstanding, vertically extending wall 15 surrounding the receiving area 11 and mounting portion 30 of the steering wheel 12. The capture plate 14 preferably extends generally perpendicular to the mounting portion 30. It will be appreciated that the capture plate 14 may be attached to the mounting portion 30 of the steering wheel 12 such that the invention can be adapted for use with any steering wheel having a mounting portion 30. The capture plate 14 is preferably continuous for increased strength to withstand the forces during air bag deployment. However, it will also be appreciated that the capture plate 14 could be integrally formed with the mounting portion 30 such that the capture plate 14 provides the integral upstanding, vertically extending wall 15 around the mounting portion 30, and thus is not separately attached to the mounting portion 30. For example, the mounting portion 30 could be made of a cast or molded material, such as magnesium or plastic, and the capture plate 14 could be integrally formed with the mounting portion 30 during manufacturing for nominal cost. It will further be appreciated that the capture plate 14 could also be formed of multiple upstanding, vertically extending pieces attached to the mounting portion 30 of the steering wheel 12, which may be desirable to decrease sensitivity to tolerances when attaching the capture plate 14 to the mounting portion 30. It will also be appreciated that the capture plate 14, rim portion 22, mounting portion 30 and spoke portions 20 preferably have outer surfaces covered with a layer of foam or other plastic material for an aesthetically pleasing appearance.

As best shown in FIG. 2, the component parts of the air bag module 50 include a base plate 70, a cover 40, an air bag retainer 60, an air bag 80, an inflator 90, and fastener mechanisms 100 for retaining and mounting the module 50 including first and second mounting members 110, 120, respectively. Advantageously, the cover 40 is secured to the base plate 70 without the use of fasteners simply by unidirectional insertion of the module 50 into the receiving area 11 of the steering wheel 12 whereby the cover 40 is secured to the module 50 by interaction with the capture plate 14 on the steering wheel 12, as described in detail below. The air bag 80, air bag retainer 60, and inflator 90 are each connected to the base plate 70 and then mounted to the steering wheel 12 by cooperation of the first and second mounting members 110, 120, as described further hereinafter.

Referring to FIG. 2, the air bag 80 may be of a conventional construction and material. The air bag 80 includes a central air bag opening 82 for receiving inflator gas therein to inflate the air bag 80. The air bag 80 includes a plurality of air bag apertures 86 which are circumferentially spaced apart around the air bag opening 82. An air bag retainer 60 is located within the air bag 80 adjacent the air bag opening 82 for supporting and anchoring the air bag 80 during inflation. The air bag retainer 60 is preferably metallic and includes a central gas opening 64 for receiving the inflator 90 partially therethrough. The air bag retainer 60 includes a plurality of air bag retainer apertures 68 circumferentially spaced for alignment with the air bag apertures 86.

As shown in FIG. 2, the module 50 includes the inflator 90 for generating gas to inflate the air bag 80 when the inflator 90 receives a predetermined signal from a vehicle sensor, not shown. The inflator 90 has a generally circular shape and may be of a conventional construction for discharging gas such as through ports 92 in a main body 94 to inflate the air bag 80. The main body 94 of the inflator 90 is located partially within the air bag opening 82 and partially extends through the central gas opening 64 of the air bag retainer 60. The inflator 90 further includes a peripheral radially outwardly extending inflator flange 96 which may be integral with the inflator 90 or attached to the main body 94, such as by welding or fastening. The inflator flange 96 includes a plurality of inflator flange apertures 98 circumferentially spaced for axial alignment with the air bag apertures 86 and the air bag retainer apertures 68.

Referring to FIG. 2, the base plate 70 is preferably metallic and includes a central circular plate opening 72 sized slightly larger than the main body 94 of the inflator 90 and sized for alignment with the central gas opening 64 of the air bag retainer 60. The base plate 70 includes a plurality of base plate apertures 74 circumferentially spaced for alignment with respective air bag apertures 86, air bag retainer apertures 68, and inflator flange apertures 98. A perimeter of the base plate 70 includes an upturned, vertically extending flange portion 75 having boss apertures 76 circumferentially spaced apart for alignment with bosses 44 on tab portions 42 of the cover 40, as described further hereinafter. The boss apertures 76 are preferably sized for closely receiving the bosses 44 on the cover 40 therein such that the cover 40 is initially loosely attached to the base plate 70 while leaving the cover 40 free for manual removal from the base plate 70. Advantageously, the cover 40 is loosely attached to the base plate 70 such that the cover 40 is attached securely enough for transport and storage of the module 50, but not tightly enough to withstand the forces of air bag inflation.

Figure 5:
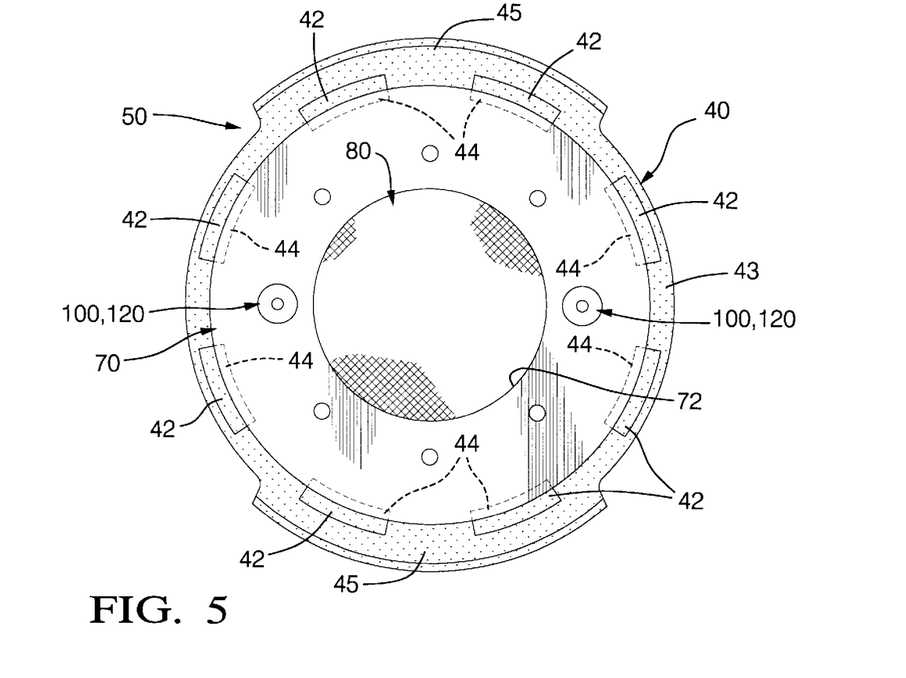
FIG. 5 is a plan view of the air bag module with a cover loosely connected to the base plate and showing the underside of the cover and base plate, but not showing the inflator for clarity.

Referring to FIGS. 1, 3 and 5, the cover 40 is preferably integrally molded from a suitable plastic material and serves as an aesthetically pleasing covering for the other components of the module 50. The cover 40 has an upper surface 39 which preferably includes tear lines or weakened portions 41 shown in FIG. 1 that allow the cover 76 to open during air bag 80 inflation. As best shown in FIGS. 2 and 3, the cover 40 further includes downward, vertically extending side walls 43 which cooperatively form a container shaped for closely holding the air bag 80 in the folded condition. The side walls 43 of the cover 40 preferably include downward, vertically extending tab portions 42 which are circumferentially spaced apart around the side walls 43. Preferably, the tab portions 42 are outwardly flexible for ease of assembling the cover 40 to the base plate 70. It will be appreciated that there could be more or fewer tabs portions 42 on the cover 40 than are shown in the preferred embodiment. For example, a single continuous tab portion 42 could extend downwardly from the side walls 43 of the cover 40. The tab portions 42 each preferably include at least one inwardly projecting boss 44 integrally formed thereon. The bosses 44 preferably extend at right angles to the tab portions 42 and have a generally planar shape. The bosses 44 on the tab portions 42 are circumferentially spaced apart around the side walls 43 of the cover 40 for alignment with the boss apertures 76 on the base plate 70 for slip-fitted attachment therein during initial manual loose connection of the cover 40 to the base plate 70.

The cover 40 further includes outer cover flanges 45 which extend radially outward and vertically downward from selected portions of the side walls 43 of the cover 40. Thus, as best shown in FIGS. 3 and 5, the outer cover flanges 45 are spaced radially outward from the tab portions 42. The outer cover flanges 45 extend radially outwardly from the capture plate 14 and vertically downward such that they are long enough to cover the capture plate 14 on the steering wheel 12 and the tab portions 42 when the module 50 is attached to the steering wheel 12. As best shown in FIG. 1, the outer cover flanges 45 are positioned on the cover 40 for alignment and radial extension between the spoke portions 20 of the steering wheel 12 when the module 50 is attached to the steering wheel 12. Thus, the outer cover flanges 45 provide an aesthetically pleasing appearance to the air bag module and steering wheel assembly 10 by advantageously covering the capture plate 14 and tab portions 42 and extending between the spoke portions 20 for providing a smooth appearance to the assembly 10.

The module 50 is assembled separate and independent from the steering wheel 12 as follows. As shown in FIG. 2, the fastener mechanisms 100 are used to connect the module components to the base plate 70, except for the cover 50, and also for mounting the module 50 to the steering wheel 12. The fastener mechanisms 100 include first mounting members 110 rigidly connected to the air bag retainer 60 and second mounting members 120 threadably engaging the first mounting members 110. The air bag retainer 60, the air bag 80, the base plate 70 and inflator 90 are each connected to each other simply by screwing the second mounting members 120 to the first mounting members 110. The first and second mounting members 110, 120 enable facile assembly and disassembly of the air bag retainer 60, air bag 80, base plate 70 and inflator 90 to each other and also enable facile assembly and disassembly of the module 50 to the mounting portion 30 of the steering wheel 12, as described below.

The cover 40 is preferably added to the module 50 after the air bag 80 is folded to maintain the air bag 80 in the folded condition. The cover 40 is easily initially loosely connected by manual operation to the base plate 70 such that the cover 40 is free for manual removal from the base plate 70 as follows. The bosses 44 on the tab portions 42 are aligned with the boss apertures 76 on the base plate 70 and the bosses 44 are each slip-fittedly inserted into the boss apertures 76. Preferably, the cover 40 may be placed upside down while the air bag 80 and air bag retainer 60 are inserted in the cover 40 and while the cover 40 is attached to the base plate 70. It will be appreciated that the inflator 90 may be secured to the base plate 70 either before or after attachment of the cover 40. The tab portions 42 of the cover 40 are preferably resilient such that they can be flexed radially outward to receive the base plate 70 therebetween and then flex radially inward such that the bosses 44 are slip-fittedly inserted into the boss apertures 76. When the bosses 44 are seated in the boss apertures 76, the cover 40 is sufficiently loosely connected to the base plate 70 such that the module 50 can be transported or stored until it is secured to the mounting portion 30 of the steering wheel 12. The cover 40 being loosely connected to the base plate 70 is free for manual removal from the base plate 70. It will be appreciated that the bosses 44 are preferably straight inwardly projecting planar bosses 44 and are not hook-shaped, such that they easily can be slipped into the boss apertures 76 on the base plate 70. Thus, the bosses 44 are easy to insert into the boss apertures 76 during assembly. This is possible since the cover 40 need only be initially loosely connected to the base plate 70 for transport and storage of the module 50, but not sufficiently connected to withstand the forces of air bag inflation. Advantageously, this is possible since unidirectional insertion of the module 50 into the receiving area 11 of the steering wheel 12 simultaneously anchors the cover 40 to the base plate 70 by the capture plate 14 trapping the tab portions 42, as described below.

The second mounting members 120 are adapted for releasable connection to the mounting portion 30 for mounting the module 50 to the steering wheel 12 while simultaneously securing the cover 40 to the base plate 70, as will now be described. The lower portions of the second mounting members 120 extend downwardly towards the mounting portion 30 of the steering wheel 12 and include tapered distal ends 132 having an annular groove 134 thereon. The distal ends 132 of the second mounting members 120 are spaced for matable alignment with the mounting apertures 36 on the mounting portion 30 for insertion through the mounting apertures 36 to securely connect the module 50 to the mounting portion 30 and to simultaneously anchor the cover 40 to the base plate 70. The mounting portion 30 carries springs 125 which resiliently snap into the annular grooves 134 to securely connect the module 50 to the steering wheel 12 by snap-fitted attachment to provide the air bag module and steering wheel assembly 10. When the entire air bag module 50, and thus the second mounting members 120 are moved unidirectionally in a downward direction towards the mounting portion 30 and through the mounting apertures 36, the springs 125 will move laterally outward until they are aligned with the annular grooves 134 in the distal ends 132, at which time the springs 125 will move laterally inward into latching engagement with the grooves 134. Once the springs 125 are engaged with the grooves 134 of the second mounting members 120, the entire module 50 is securely attached to the mounting portion 30 of the steering wheel 12.

Advantageously, when the module 50 is unidirectionally inserted into the receiving area 11 and attached to the mounting portion 30 of the steering wheel 12, the tab portions 42 of the cover 40 are simultaneously captured and securely trapped between the vertically extending flange portion 75 of the base plate 70 and the vertically extending wall 15 of the capture plate 14 of the steering wheel 12. Since the tab portions 42 are trapped, the bosses 44 are also trapped within the boss apertures 76 of the base plate 70. Thus, the cover 40 is securely anchored to the assembly 10 without the use of fasteners. Instead, the mating engagement of the base plate 70 of the module 50 with the upstanding capture plate 14 of the steering wheel 12 securely anchors the cover 40 to the base plate 70 such that the cover 40 is anchored to the assembly 10 for withstanding the forces of air bag inflation.

Disassembly of the air bag module 50 from the mounting portion 30 is easily accomplished as follows. A suitable tool, such as flat blade screwdriver (not shown), may be inserted through access openings (not shown) provided in steering wheel 12 wherein the screwdriver biases the springs 125 laterally outward such that the springs 170 pop out of engagement with the grooves 134 in the second mounting members 120. In this manner, after the springs 125 are released, the module 50 can be pulled forward and away from the mounting portion 30 such that the tab portions 42 are easily released from the capture plate 14 by unidirectional removal. Once the module 50 is removed from the steering wheel 12 and the capture plate 14 no longer secures the tab portions 42, the bosses 44 can be pulled radially outward, out of engagement with the boss apertures 76 to remove the cover 40 to service the underlying components, such as an underlying horn switch (not shown), without damage to the cover 40 which can then be reused.

Upon actuation, the inflator 90 discharges inflator gas. The ports 92 of the inflator 90 direct the discharging inflator gas upwardly to inflate the air bag 80 which will deploy out through the weakened portions 41 of the cover 76. During the application of the forces associated with the discharge of inflator gas, the vertically extending wall 15 of the upstanding capture plate 14 on the steering wheel 12 traps the bosses 44 in the boss apertures 76 of the base plate 70 to securely anchor the cover 40 to the base plate 70 without the use of fasteners.

It will be understood that a person skilled in the art may make modifications to the preferred embodiment shown herein within the scope and intent of the claims.

Figure 6:
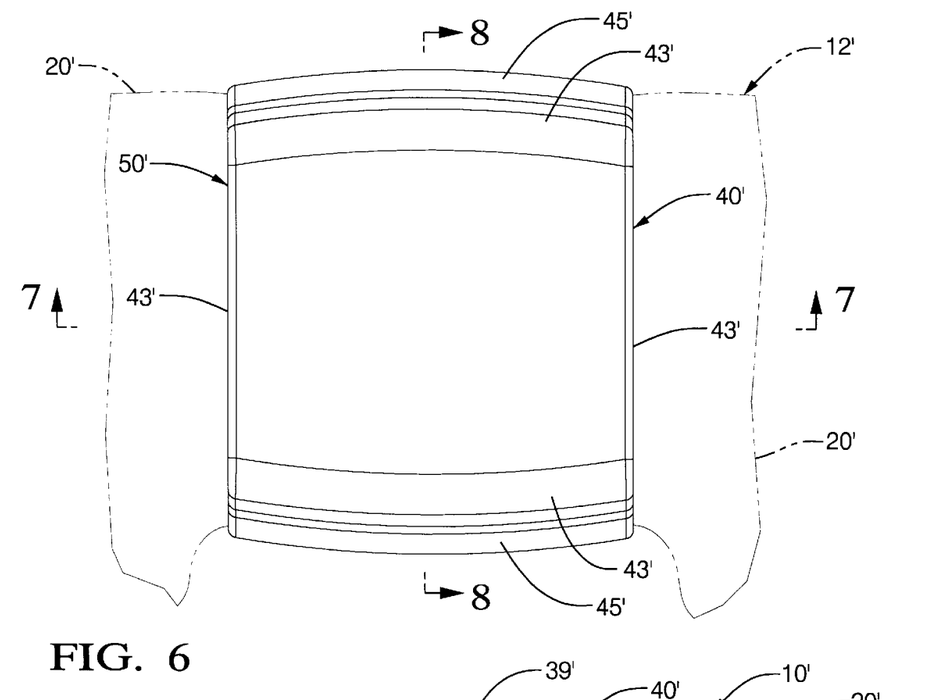
FIG. 6 shows a top plan view of an alternate embodiment of the air bag module and steering assembly in the fully assembled condition.
Figure 7:
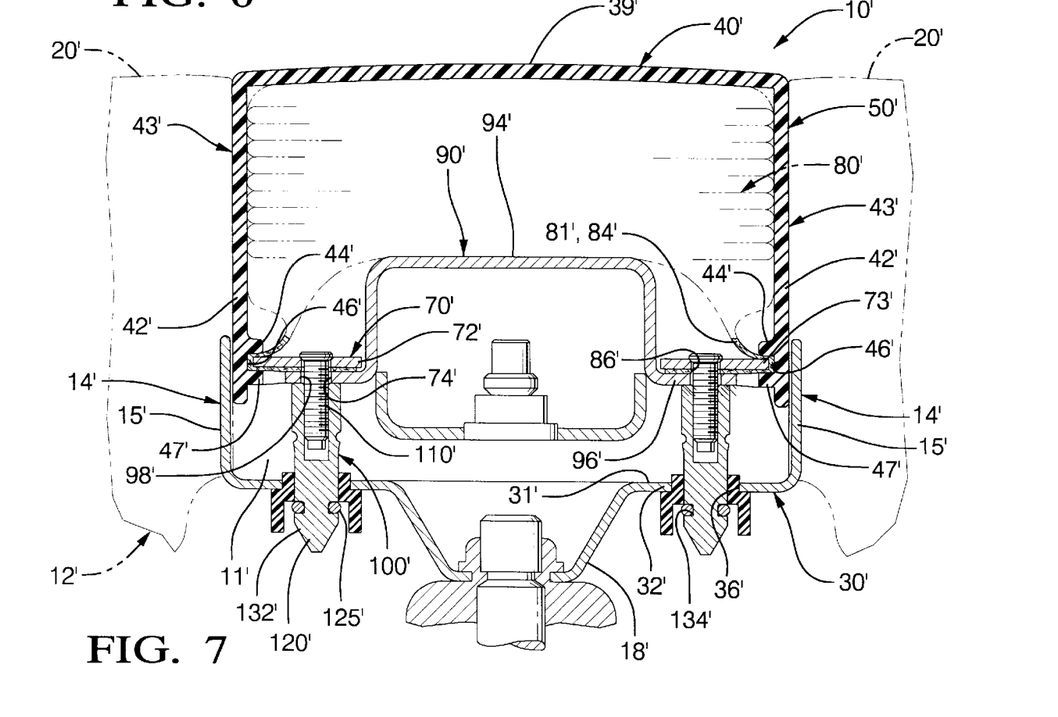
FIG. 7 is a sectional view taken along line 7—7 of FIG. 6.
Figure 8:
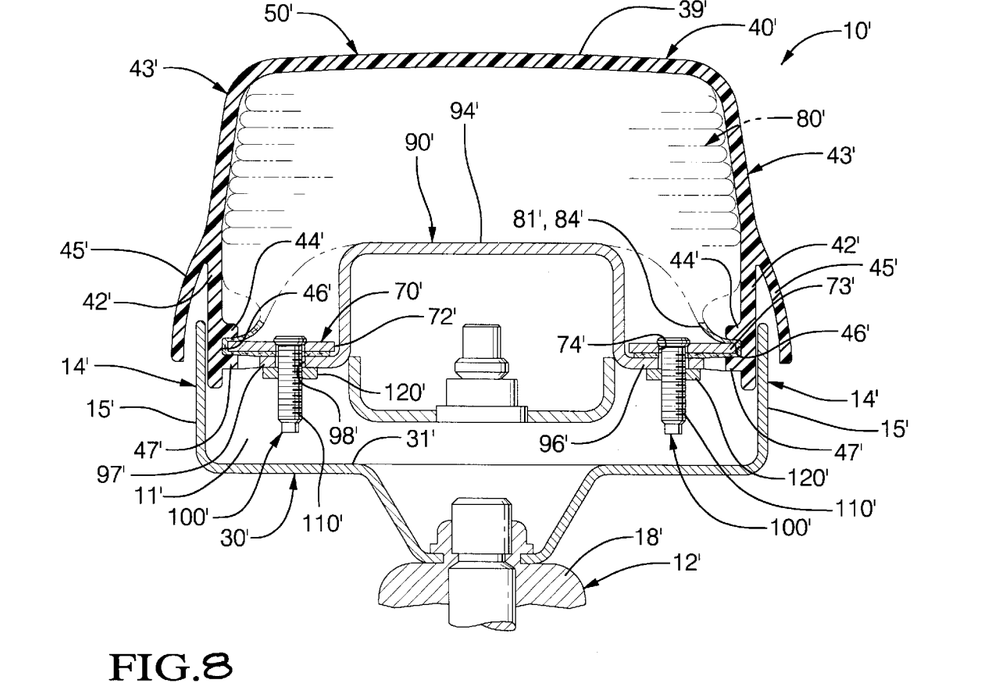
FIG. 8 is a sectional view taken along line 8—8 of FIG. 6.

Referring to FIGS. 6 and 7, an air bag module and steering wheel assembly, generally designated as 10', includes a steering wheel 12' for mounting on a steering column (not shown) and an air bag module 50' mounted on the steering wheel 12'. As best shown in FIGS. 7 and 8, the steering wheel 12' includes a mounting portion 30' attached to a central hub portion 18' and outwardly extending spoke portions 20'. An outer circular rim portion (not shown) may be connected to the central hub portion 18' by the spoke portions 20'. As best shown in FIGS. 7 and 8, the steering wheel 12' has an open receiving area 11' for receiving the air bag module 50' therein. The air bag module 50' is inserted within the receiving area 11' and mounted to the mounting portion 30' of the steering wheel 12', as described hereinafter.

Similar to the embodiment of FIGS. 1–5, the mounting portion 30' is preferably made of a sturdy material, such as metal, and is preferably welded to or integrally molded with the hub portion 18' and spoke portions 20' of the steering wheel 12'. The mounting portion 30' preferably has a generally planar mounting surface 31' and has a generally rectangular shape. As shown in FIG. 7, the mounting portion 30' includes a plurality of mounting apertures 36' for attachment of the air bag module 50', as described further hereinafter.

As best shown in FIGS. 7 and 8, the steering wheel 12' further includes a capture plate 14' which is integrally formed with the mounting portion 30'. The capture plate 14' is preferably a single continuous rectangle having the same geometric shape as the side edges 32' of the mounting portion 30' for ease of attachment thereto. The capture plate 14' is preferably made of a rigid sturdy material, such as metal. The capture plate 14' preferably extends generally perpendicular to the mounting portion 30' and is generally vertically extending relative to the steering wheel 12' and mounting portion 30' for ease of insertion of the module 50' into the receiving area 11 ' of the steering wheel 12', as described further hereinafter. The capture plate 14' provides an upstanding, vertically extending wall 15' surrounding the receiving area 11' and mounting portion 30' of the steering wheel 12'. It will be appreciated that the capture plate 14' may also be a separate part attached to the mounting portion 30' of the steering wheel 12' such that the invention can be adapted for use with any steering wheel 12' having a mounting portion 30'. The capture plate 14' is preferably continuous for increased strength to withstand the forces during air bag deployment. Advantageously, the capture plate 14' is integrally formed with the mounting portion 30' such that the capture plate 14' provides the integral upstanding, vertically extending wall 15' around the mounting portion 30', and thus preferably is not separately attached to the mounting portion 30'. It will further be appreciated that the capture plate 14' could also be formed of multiple upstanding, vertically extending pieces formed with the mounting portion 30' of the steering wheel 12'. It will also be appreciated that the capture plate 14', steering wheel rim portion, mounting portion 30' and spoke portions 20' preferably have outer surfaces covered with a layer of foam or other plastic material for an aesthetically pleasing appearance.

As best shown in FIGS. 7 and 8, the component parts of the air bag module 50' include a base plate 70', a cover 40', an air bag 80', an inflator 90', and fastener mechanisms 100' for retaining and mounting the module 50' including first and second mounting members 110', 120', respectively. Advantageously, the cover 40' is secured to the base plate 70' without the use of fasteners simply by unidirectional insertion of the module 50' into the receiving area 11' of the steering wheel 12' whereby the cover 40' is secured to the module 50' by interaction with the capture plate 14' on the steering wheel 12', as described in detail below. The air bag 80' and inflator 90' are each connected to the base plate 70' and then mounted to the steering wheel 12' by cooperation of the first and second mounting members 110', 120', as described further hereinafter.

Figure 10:
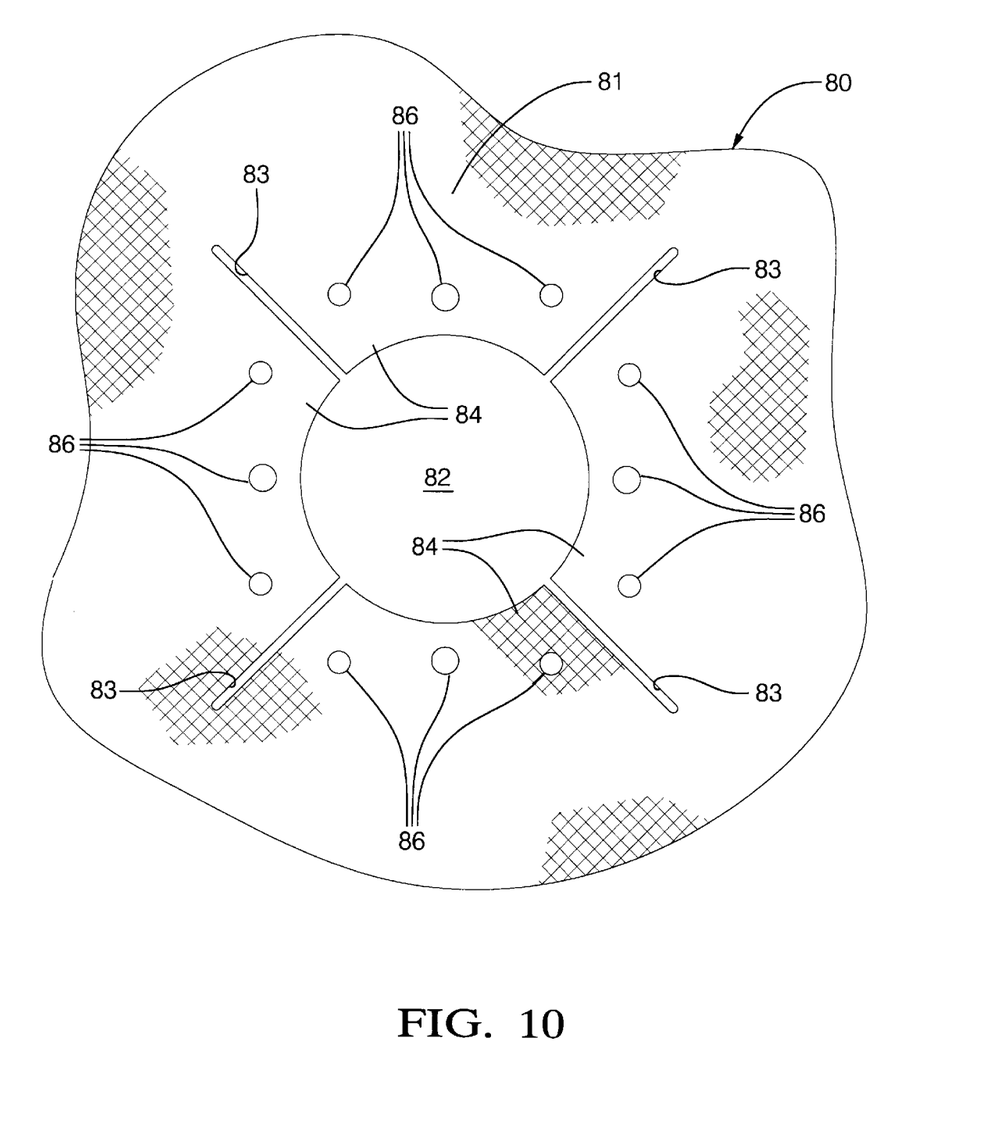
FIG. 10 is a partially-broken-away view of an alternate air bag for the embodiment of FIG. 6.

Referring to FIGS. 7, 8 and 10, the air bag 80' may be made of any type of suitable air bag material. The air bag 80' includes a central air bag opening 82' for receiving inflator gas therein to inflate the air bag 80'. The air bag 80' includes a mouth portion 81' surrounding the air bag opening 82'. The mouth portion 81' preferably includes radially extending air bag slits 83' which divide the mouth portion 81' into four flaps 84'. The mouth portion 81' of the air bag 80' includes a plurality of air bag apertures 86' which are circumferentially spaced apart around the air bag opening 82'. The flaps 84' are each used to attach the air bag 80' to the base plate 70', as described further hereinafter. Thus, the air bag retainer 60 as found in the prior embodiment is eliminated.

As best shown in FIGS. 7 and 8, the module 50' includes the inflator 90' for generating gas to inflate the air bag 80' when the inflator 90' receives a predetermined signal from a vehicle sensor, not shown. The inflator 90' has a generally circular shape and may be of a conventional construction for discharging gas such as through ports in a main body 94' to inflate the air bag 80'. The main body 94' of the inflator 90' is located partially within the air bag opening 82' and is surrounded by the mouth portion 81' of the air bag 80' and by the base plate 70'. The inflator 90' further includes a peripheral radially outwardly extending inflator flange 96' which may be integral with the inflator 90' or attached to the main body 94', such as by welding or fastening. The inflator flange 96' includes a plurality of inflator flange apertures 98' circumferentially spaced for axial alignment with the air bag apertures 86'. The inflator flange 96' may include enlarged portions 97' on which the inflator flange apertures 98' are located, as best seen in FIG. 9.

Referring to FIGS. 7 and 8, the base plate 70' is preferably metallic and includes a central circular plate opening 72' sized slightly larger than the main body 94' of the inflator 90'. The base plate 70' includes a plurality of base plate apertures 74' circumferentially spaced for alignment with respective air bag apertures 86' and inflator flange apertures 98'. The base plate 70' preferably has a generally planar shape and a perimeter of the base plate 70' includes flat outer edges 73' positioned for attachment to the cover 40', as described further hereinafter. The base plate 70' at the outer edges 73' has a thickness for closely fitting within a cover slot 46' of the cover 40' such that the cover 40' is initially loosely attached to the base plate 70' while leaving the cover 40' free for manual removal from the base plate 70'. Advantageously, the cover 40' is loosely attached to the base plate 70' such that the cover 40' is attached securely enough for transport and storage of the module 50', but not tightly enough to withstand the forces of air bag inflation.

Referring to FIGS. 6–9, the cover 40' is preferably integrally molded from a suitable plastic material and serves as an aesthetically pleasing covering for the other components of the module 50'. The cover 40' has an upper surface 39' which preferably includes any suitable pattern of tear lines or weakened portions (not shown) that allow the cover 76' to open during air bag 80' inflation.

Figure 9:
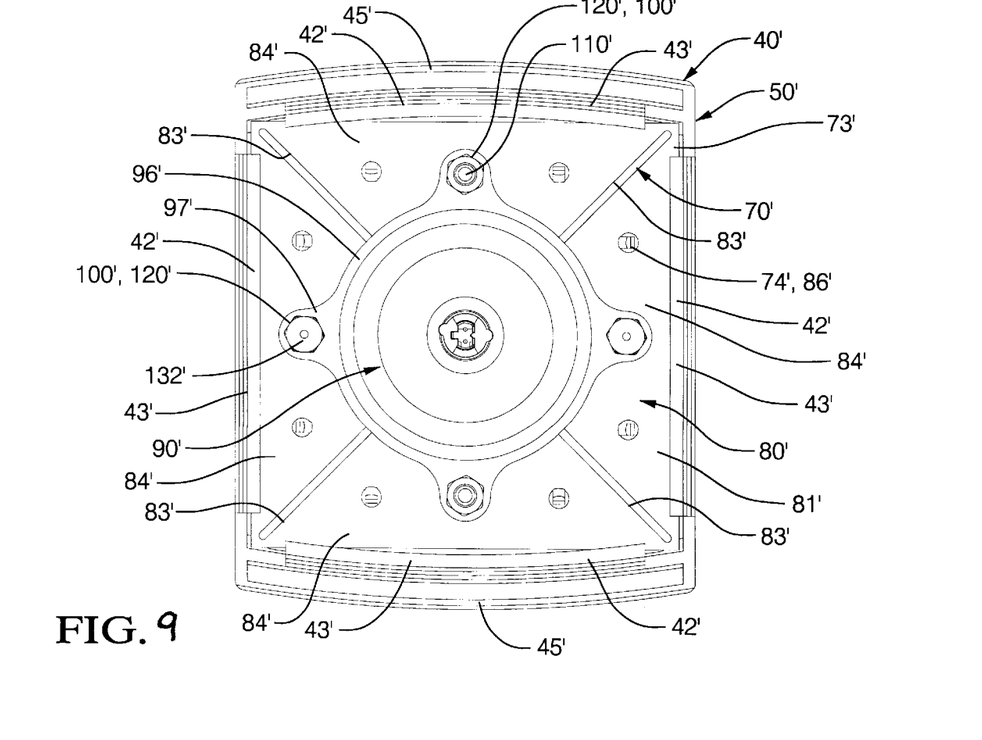
FIG. 9 is a bottom view of the assembly of FIG. 6.

As best shown in FIGS. 7, 8 and 9, the cover 40' further includes downward, vertically extending side walls 43' which cooperatively form a container shaped for closely holding the air bag 80' in the folded condition. The side walls 43' of the cover 40' preferably include downward, vertically extending tab portions 42' which are circumferentially spaced apart around the side walls 43'. Preferably, the tab portions 42' are outwardly flexible for ease of assembling the cover 40' to the base plate 70'. It will be appreciated that there could be more or fewer tabs portions 42' on the cover 40' than are shown in the preferred embodiment. For example, a single continuous tab portion 42' could extend downwardly from the side walls 43' of the cover 40'.

The tab portions 42' each preferably include at least one inwardly projecting upper boss 44' and at least one inwardly projecting lower boss 47'. The upper and lower bosses 44', 47' are each preferably integrally formed on the cover 40'. The lower bosses 47' are preferably spaced apart directly below the upper bosses 44' such that cover slots 46' are defined between the bosses 44', 47'. It will be appreciated that while the cover slots 46' are preferably formed by protruding bosses 44', 47' that the cover slots 46' could alternately be formed by providing recesses in the side walls 43'. The upper and lower bosses 44', 47' preferably extend at right angles to the tab portions 42' and have a generally planar shape. The upper and lower bosses 44', 47' on the tab portions 42' are vertically spaced apart for closely receiving the outer edges 73' of the base plate 70' and the mouth portion 81' of the air bag 80' therein for slip-fitted attachment of the cover 40' to the base plate 70' during initial manual loose connection of the cover 40' to the base plate 70', as described further hereinafter.

The cover 40' further includes outer cover flanges 45' which extend radially outward and vertically downward from selected portions of the side walls 43' of the cover 40'. As best shown in FIGS. 7, 8, and 9, the outer cover flanges 45' are spaced radially outward from the tab portions 42'. The outer cover flanges 45' extend radially outwardly from the capture plate 14' and vertically downward such that they are long enough to cover the capture plate 14' on the steering wheel 12' and the tab portions 42' when the module 50' is attached to the steering wheel 12'. As best shown in relation to FIGS. 7, 8 and 9, the outer cover flanges 45' are positioned on the cover 40' preferably for alignment and radial extension between the spoke portions 20' of the steering wheel 12' when the module 50' is attached to the steering wheel 12'. Thus, the outer cover flanges 45' provide an aesthetically pleasing appearance to the air bag module and steering wheel assembly 10' by advantageously covering the capture plate 14' and tab portions 42' and extending between the spoke portions 20' for providing a smooth appearance to the assembly 10'.

The module 50' is assembled separate and independent from the steering wheel 12' as follows. The first mounting members 110' are preassembled to the base plate 70' and extend downwardly therethrough. Next, the air bag 80' is connected to the base plate 70' by wrapping the flaps 84' of the mouth portion 81' of the air bag 70' around the outer edges 73' of the base plate 70' and inserting the first mounting members 110' through the respective air bag apertures 86' to loosely connect the air bag 80' to the base plate 70'.

Referring to FIGS. 7 and 8, the fastener mechanisms 100' are used to more securely connect the module components to the base plate 70', except for the cover 40', and also for mounting the module 50' to the steering wheel 12'. The fastener mechanisms 100' include first mounting members 110' rigidly connected to the base plate 70' and second mounting members 120' threadably engaging the first mounting members 110'. The air bag 80', the base plate 70', and inflator 90' are each securely connected to each other simply by screwing the second mounting members 120' to the first mounting members 110' such that the mouth portion 81' of the air bag 80' is sandwiched between the inflator flange 86' and the base plate 70'. The first and second mounting members 110', 120' enable facile assembly and disassembly of the air bag 80', base plate 70', and inflator 90' to each other and also enable facile assembly and disassembly of the module 50' to the mounting portion 30' of the steering wheel 12'.

The cover 40' is preferably added to the module 50' after the air bag 80' is folded to maintain the air bag 80' in the folded condition. The cover 40' is easily initially loosely connected by manual operation to the base plate 70' such that the cover 40' is free for manual removal from the base plate 70' as follows. The cover 40' is slipped over the air bag 80' and base plate 70' until the cover slots 46' are generally aligned with the outer edges 73' of the base plate 70'. As best shown in FIGS. 7 and 8, the outer edges 73' of the base plate 70' covered by the mouth portion 81' of the air bag 80' are seated in the cover slots 46' such that the upper bosses 44' are positioned above the base plate 70' and such that the lower bosses 47' are positioned below the base plate 70'. Preferably, the cover 40' may be placed upside down while the air bag 80' and base plate 70' are inserted in the cover 40'. It will be appreciated that the inflator 90' may be secured to the base plate 70' either before or after attachment of the cover 40' by removing and reconnecting the second mounting members 120' for later assembly of the inflator 90'. The tab portions 42' of the cover 40' are preferably resilient such that they can be flexed radially outward to receive the base plate 70' and air bag 80' therebetween and then flex radially inward such that the outer edges 73' of the base plate 70' covered by the air bag 80' are slip-fittedly received between the bosses 44', 47' and within the cover slots 46'. When the upper and lower bosses 44', 47' are positioned above and below the base plate 70' such that the outer edges 73' of the cover 40' are seated in the cover slots 46', the cover 40' is sufficiently loosely connected to the base plate 70' such that the module 50' can be transported or stored until it is secured to the mounting portion 30' of the steering wheel 12'. The cover 40' being loosely connected to the base plate 70' is free for manual removal from the base plate 70'. It will be appreciated that the bosses 44', 47' are preferably straight inwardly projecting planar bosses 44', 47' and are not hook-shaped, such that they easily can be slipped over the outer edges 73' of the base plate 70'.

The second mounting members 120' are adapted for releasable connection to the mounting portion 30' for mounting the module 50' to the steering wheel 12' while simultaneously securing the cover 40' to the base plate 70', as will now be described. The lower portions of the second mounting members 120' extend downwardly towards the mounting portion 30' of the steering wheel 12' and include tapered distal ends 132' having an annular groove 134' thereon. The distal ends 132' of the second mounting members 120' are spaced for matable alignment with the mounting apertures 36' on the mounting portion 30' for insertion through the mounting apertures 36' to securely connect the module 50' to the mounting portion 30' and to simultaneously anchor the cover 40' to the base plate 70'. The mounting portion 30' carries springs 125' which resiliently snap into the annular grooves 134' to securely connect the module 50' to the steering wheel 12' by snap-fitted attachment to provide the air bag module and steering wheel assembly 10'. When the entire air bag module 50', and thus the second mounting members 120' are moved unidirectionally in a downward direction towards the mounting portion 30' and through the mounting apertures 36', the springs 125' will move laterally outward until they are aligned with the annular grooves 134' in the distal ends 132', at which time the springs 125' will move laterally inward into latching engagement with the grooves 134'. Once the springs 125' are engaged with the grooves 134' of the second mounting members 120', the entire module 50' is securely attached to the mounting portion 30' of the steering wheel 12'.

Advantageously, when the module 50' is unidirectionally inserted into the receiving area 11' and attached to the mounting portion 30' of the steering wheel 12', the tab portions 42' of the cover 40' are simultaneously captured and securely trapped between the outer edges 73' of the base plate 70' and the vertically extending wall 15' of the capture plate 14 of the steering wheel 12'. Since the tab portions 42' are trapped, the upper and lower bosses 44', 47' are also trapped above and below the base plate 70', respectively. In addition, the outer edges 73' of the base plate 70' and the mouth portion 81 of the air bag 80' are securely trapped in the cover slots 46'. In addition, the mouth portion 81' of the air bag 80' is also securely trapped between the bosses 44', 47'. Thus, the cover 40' is securely anchored to the assembly 10' without the use of fasteners. Instead, the mating engagement of the base plate 70' of the module 50' with the upstanding capture plate 14' of the steering wheel 12' securely anchors the cover 40' to the base plate 70' such that the cover 40' is anchored to the assembly 10' for withstanding the forces of air bag inflation.

Disassembly of the air bag module 50' from the mounting portion 30' is accomplished similar to the method which was described above with respect to FIGS. 1–5.

It is also contemplated within the scope of this invention, that the inflator flange 96' could also serve both as the base plate 70' and that a separate base plate 70' could be eliminated. In that case, the mounting members 100' would be connected directly to the inflator flange 96' and the air bag 80' is attached to the inflator flange 96' in a manner similar to that described above for the base plate 70'.

While the present invention has been described as carried out in a specific embodiment thereof, it is not intended to be limited thereby but is intended to cover the invention broadly within the scope and spirit of the appended claims.

What is claimed is:

1. An air bag module and steering wheel assembly comprising:
   an air bag module including
     a base plate,
     an air bag,
     at least one mounting member extending from the base plate and extending through the air bag to attach the air bag to the base plate; and
     a cover having at least one vertically extending side wall including at least one cover slot in which the air bag and base plate are loosely seated while leaving the cover free for manual removal from the base plate, the air bag being trapped in the cover slot between side wall and the base plate; and
   a steering wheel having
     a receiving area for receiving the module therein for attachment to the steering wheel, and
     an upstanding capture plate forming a vertically extending wall surrounding the receiving area, the capture plate engaging the side wall of the cover when the module is inserted into the receiving area and capturing the side wall of the cover and the air bag between the base plate and the capture plate such that the cover and the air bag are anchored to the base plate for withstanding the forces of air bag inflation.

2. The assembly of claim 1 further including an inflator having a radially outwardly extending inflator flange, and wherein the base plate is separate from the inflator flange, the mounting member extending through the inflator flange to connect the inflator flange to the base plate and wherein the air bag is captured between the inflator flange and the base plate.

3. The assembly of claim 1 wherein the cover slot is defined by an upper boss and a lower boss and wherein the air bag and base plate are captured between the upper and lower bosses.

4. The assembly of claim 1 wherein the cover slot is defined by an upper boss and a lower boss, the lower boss being spaced apart directly beneath the upper boss, and wherein the air bag and base plate are captured between the upper and lower bosses.

5. The assembly of claim 1 wherein the side wall of the cover includes a plurality of upper bosses and a plurality of lower bosses thereon, and wherein the lower bosses are spaced vertically beneath the upper bosses, the upper bosses being positioned above the base plate and the lower bosses being positioned below the base plate when the cover is connected to the base plate, the air bag being wrapped around the base plate for engaging both the upper and lower bosses, whereby upon insertion of the module into the receiving area of the steering wheel, the capture plate traps the air bag between the side wall and the capture plate and also traps the upper and lower bosses above and below the base plate, respectively, to anchor the cover to the base plate during air bag deployment.

6. The assembly of claim 5 wherein the upper and lower bosses are generally planar and extend generally perpendicular to and radially inward from the side wall of the cover.

7. The assembly of claim 1 wherein the side wall of the cover includes a plurality of downwardly extending tab portions each having upper and lower inwardly projecting bosses thereon, and wherein the lower bosses are spaced vertically beneath the upper bosses, the upper bosses being positioned above the base plate and the lower bosses being positioned below the base plate when the cover is connected to the base plate, the air bag being wrapped around the base plate and being positioned between the upper and lower bosses and the base plate, whereby upon insertion of the module into the receiving area of the steering wheel, the tab portions are trapped between the base plate and the vertically extending wall of the capture plate and wherein the tab portions are prevented from outward movement and wherein the respective bosses are trapped above and below the base plate to anchor the cover and the air bag to the base plate during air bag deployment.

8. The assembly of claim 7 wherein the upper and lower bosses are generally planar and extend generally perpendicular to and radially outward from the side walls of the cover.

9. The assembly of claim 1 wherein the capture plate is a single continuous plate surrounding the receiving area of the steering wheel.

10. The assembly of claim 1 wherein the steering wheel includes a mounting portion to which the module is mounted and wherein the capture plate is integrally formed with the mounting portion of the steering wheel.

11. The assembly of claim 10 wherein the vertically extending wall of the capture plate extends generally perpendicular to the mounting portion.

12. The assembly of claim 1 wherein the module is unidirectionally inserted into the receiving area of the steering wheel and wherein the vertically extending wall of the capture plate is parallel to the insertion direction of the module into the receiving area of the steering wheel.

13. The assembly of claim 1 wherein the steering wheel includes spaced apart spoke portions extending radially outward from the capture plate and wherein the cover includes a downwardly extending outer cover flange spaced radially outward from the side wall of the cover and wherein the outer cover flange extends between the spoke portions and covers the capture plate when the module is mounted in the receiving area of the steering wheel.

14. A method of assembling an air bag module and steering wheel assembly, the method comprising the steps of:
   providing an air bag module including a base plate having mounting members extending downwardly therefrom and an air bag having a mouth portion including apertures therein;
   inserting the mounting members through respective air bag apertures and wrapping the mouth portion of the air bag around an outer edge of the base plate to loosely connect the air bag to the base plate;
   providing a cover of the module having a vertically extending side wall including a plurality of inwardly projecting upper and lower bosses thereon;
   pulling the cover over the base plate and inserting the base plate and air bag between the upper and lower bosses to loosely connect the cover to the base plate for transport and storage while leaving the cover free for removal from the base plate;
   providing a steering wheel including a receiving area for receiving the module therein and the steering wheel having a capture plate including an upstanding vertical wall surrounding the receiving area; and inserting the module into the receiving area such that the vertical wall engages the side wall of the cover and simultaneously capturing the side wall of the cover and the air bag between the base plate and the vertical wall of the steering wheel such that the cover is anchored to the base plate for withstanding the forces of air bag inflation and such that the base plate and air bag are securely trapped between the upper and lower bosses.

15. The method of claim 14 further including the steps of providing an inflator having a radially outwardly extending inflator flange that is separate from the base plate and capturing the air bag between the inflator flange and the base plate.

16. A method of assembling an air bag module and steering wheel assembly, the method comprising the steps of:

providing an air bag module including a base plate having mounting members extending downwardly therefrom and an air bag having a mouth portion including apertures therein;

inserting the mounting members through respective air bag apertures and wrapping the mouth portion of the air bag around an outer edge of the base plate to loosely connect the air bag to the base plate;

providing a cover of the module having a vertically extending side wall including at least one circumferentially extending cover slot thereon;

pulling the cover over the base plate and inserting the base plate and air bag within the cover slot to loosely connect the cover to the base plate for transport and storage while leaving the cover free for removal from the base plate;

providing a steering wheel including a receiving area for receiving the module therein and the steering wheel having a capture plate including an upstanding vertical wall surrounding the receiving area; and inserting the module into the receiving area such that the vertical wall engages the side wall of the cover and simultaneously capturing the side wall of the cover and the air bag between the base plate and the vertical wall of the steering wheel such that the cover is anchored to the base plate for withstanding the forces of air bag inflation and such that the base plate and air bag are securely trapped in the cover slot.

17. The method of claim 16 further including the steps of providing an inflator having a radially outwardly extending inflator flange that is separate from the base plate and capturing the air bag between the inflator flange and the base plate.

* * * * *